(12) United States Patent
Bernasconi et al.

(10) Patent No.: US 7,149,373 B2
(45) Date of Patent: Dec. 12, 2006

(54) ACTIVE/PASSIVE MONOLITHICALLY INTEGRATED CHANNEL FILTERING POLARIZATION SPLITTER

(75) Inventors: Pietro Arturo Bernasconi, Eatontown, NY (US); Weiguo Yang, East Windsor, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 47 days.

(21) Appl. No.: 10/770,279

(22) Filed: Feb. 2, 2004

(65) Prior Publication Data

US 2005/0169567 A1  Aug. 4, 2005

(51) Int. Cl.
*G02B 6/00* (2006.01)
*G02B 6/34* (2006.01)

(52) U.S. Cl. .......................... 385/11; 385/37
(58) Field of Classification Search ............. 385/11, 385/37
See application file for complete search history.

(56) References Cited

U.S. PATENT DOCUMENTS

| | | | |
|---|---|---|---|
| 5,838,870 A * | 11/1998 | Soref | 385/131 |
| 5,953,479 A | 9/1999 | Zhou et al. | |
| 6,597,841 B1 * | 7/2003 | Dingel | 385/37 |
| 6,853,769 B1 * | 2/2005 | McGreer | 385/37 |
| 6,865,323 B1 * | 3/2005 | Samiec et al. | 385/50 |

FOREIGN PATENT DOCUMENTS

| | | |
|---|---|---|
| EP | 1 139 126 A | 10/2001 |
| EP | 1 191 364 A | 3/2002 |
| EP | 05 25 0276 | 4/2005 |

OTHER PUBLICATIONS

Vellekoop and Smit, "A Small-Size Polarization Splitter Based on a Planar Optical Phased Array", J. or Lightwave Tech., vol. 8, No. 1, Jan. 1990, pp. 118-124.

* cited by examiner

*Primary Examiner*—Sung Pak
*Assistant Examiner*—Tina M. Wong

(57) ABSTRACT

An InP on-chip polarization splitter is proposed base on an arrayed waveguide grating that is composed of waveguides having birefringence. The present invention also performs channel filtering and demultiplexing that is useful in WDM/DWDM applications. The required waveguide structure is formed using active-passive monolithic integration platforms, providing the integration of the polarization splitter with active devices as well as passive devices.

14 Claims, 3 Drawing Sheets

ACTIVE/PASSIVE MONOLITHICALLY INTEGRATED CHANNEL FILTERING POLARIZATION SPLITTER

FIELD OF THE INVENTION

This invention relates to the field of polarization splitters and, more specifically, to active-passive integrated polarization splitters.

BACKGROUND OF THE INVENTION

On-chip polarization splitters (PS) are essential in optical circuits such as advanced photonic integration circuits (PICs). Such polarization splitters are indispensable for many applications that need polarization diversity or other polarization manipulations. In terms of material systems, on-chip PS has been demonstrated in LiNbO3, polymer, glass, III–V semiconductors and other passive materials. Among these material systems, only III–V semiconductors are naturally suitable for active-passive monolithically integrated (APMI) applications. The various methods for making on-chip PS may be characterized as directional coupler or waveguide crossing based, asymmetric Y-branch based, Mach-Zehnder interferometer based, resonant tunneling based, multi-mode interference (MMI) based, and grating based.

In directional coupler or waveguide crossing based schemes, relatively large birefringence is used to make a directional coupler or waveguide crossing in bar state for one polarization and cross state for another. Asymmetric Y-branch based PS need asymmetric birefringence in two different waveguides and use mode evolution to 'sort' different polarizations into different waveguides. Mach-Zehnder interferometer based PS make inputs of different polarizations experience different optical path length difference in the interferometer so that they go to different output waveguides. Resonant tunneling based PS introduce a third waveguide in the middle of a directional coupler so that only one polarization is able to couple between two waveguides through tunneling of a middle one. MMI based PS terminate MMI coupler at imperfect imaging planes so that different polarization is able to couple to different output waveguides. Grating based PS take advantage of the fact that input of different polarizations will be diffracted to different spatial positions such that they may be separated.

However, such polarization splitters are not suitable for active-passive monolithic integration. They either rely on large material intrinsic birefringence which InGaAsP/InP material systems (i.e., for active function) do not possess, or they rely on air or metal cladding waveguides for larger birefringence, which are not compatible with low loss buried passive waveguides that can be integrated with active structures. Ultimately, it is preferred to have active functions, such as lasers, amplifiers, modulators, detectors and the like, monolithically integrated on a single chip with passive functions such as wavelength multiplexing/demultiplexing, polarization control, and signal filtering.

SUMMARY OF THE INVENTION

The present invention solves the deficiencies of the prior art by providing an on-chip, active-passive monolithically integrated InP polarization splitter based on AWG and waveguide birefringence and having multi-channel operation.

In one embodiment of the present invention an integrated polarization splitter includes an arrayed waveguide grating (AWG) having at least an input coupler, an output coupler, and a plurality of waveguides of unequal length connecting the input and output couplers. In the integrated polarization splitter of the present invention at least two output ports of the AWG are positioned relative to an input port such that a first polarization component and a second polarization component of a single channel input signal arriving at different phase fronts of a free space region at an output side of the AWG are respectively received by separate ones of the output ports such that the first polarization component and the second polarization component are split by the AWG. Furthermore, the polarization splitter is integrated using active/passive monolithic integration techniques such that the polarization splitter is capable of being integrated with active devices as well as passive devices.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Although various embodiments of the present invention are being depicted herein with respect to a single input polarization splitter splitting an input channel into TE and TM modes, the specific embodiments of the present invention should not be treated as limiting the scope of the invention. It will be appreciated by one skilled in the art informed by the teachings of the present invention that the concepts of the present invention may be applied to polarization splitters having substantially any number of inputs and outputs for splitting an input channel into various polarization modes.

As a TE-mode wave and a TM-mode wave travel along a waveguide array in an arrayed waveguide grating (AWG), the waves arrive at different phase fronts before entering the free space (FS) region at the output side of the AWG. For an input of only one wavelength channel, the FS region then focuses the TE-mode wave and the TM-mode wave onto different image spots on the output side of the AWG, shifted by a birefringence shift in wavelength on the output focal plane. Therefore by positioning output waveguides at these image positions, the AWG splits the TE-mode wave and the TM-mode wave for the single channel input. The positioning of the input and output waveguides to achieve the splitting of the TE-mode wave and the TM-mode wave of a single channel input signal is discussed generally in Arjen R. Vellekoop, "A Small-Size Polarization Splitter Based On A Planar Optical Phased Array", Journal of Lightwave Technology, Vol. 8., No. 1., January 1990, which is herein incorporated by reference in its entirety. Briefly stated, since the phase transfer of an AWG is determined by the product of the propagation constant and the total length of each channel, and because the propagation constant in a waveguide depends on the polarization as well as the wavelength of a channel, the phased array may operate as a polarization splitter as well as a wavelength multiplexer/demultiplexer. In addition, the polarization splitter of the present invention may be used to split the polarization of an input channel into other than just the TE-mode and the TM-mode depending on the positioning of the output ports.

Furthermore, by virtue of the grating free spectral range (FSR), the AWG is also capable of polarization splitting wavelengths that are separated by integer multiples of the FSR. Due to the effect of the AWG on a propagating optical signal, an input signal also gets filtered. While this makes a splitter based on an AWG wavelength dependent, such a splitter may be desirable in certain applications, for example, because such a splitter limits the impact of amplified spontaneous emission (ASE) noise.

Figure 1:
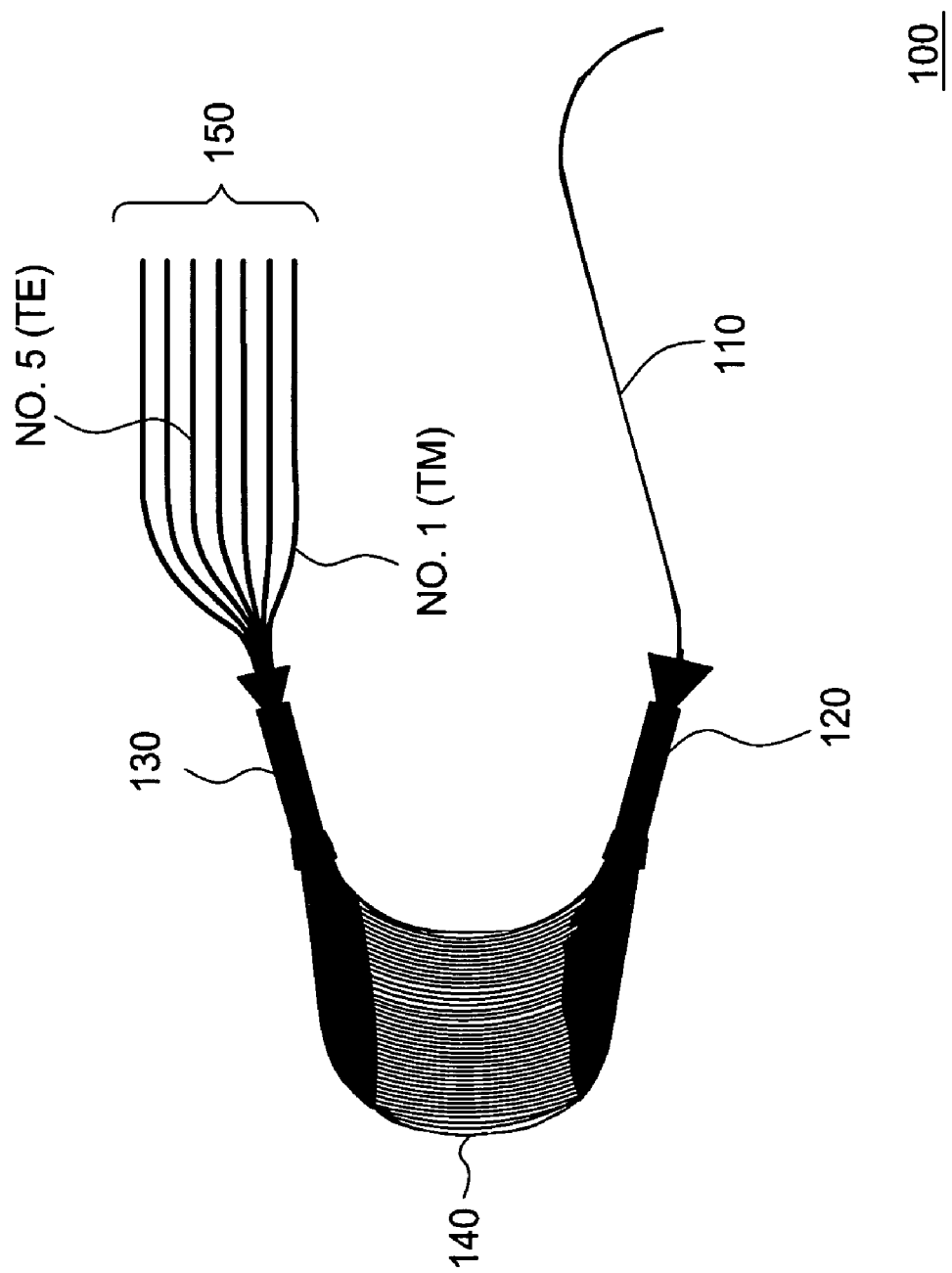
FIG. 1 depicts a high level block diagram of an embodiment of an integrated channel-filtering polarization splitter of the present invention.

FIG. 1 depicts a high level block diagram of an embodiment of an integrated channel-filtering polarization splitter of the present invention. The polarization splitter 100 of FIG. 1 comprises an AWG comprising an input waveguide 110, an input coupler (illustratively a star coupler) 120, an output coupler (illustratively a star coupler) 130, a plurality of waveguides of unequal lengths (waveguide array) 140 connecting the input coupler 120 and the output coupler 130, and a plurality of output waveguides 150. The AWG design of the polarization splitter 100 of FIG. 1 is a wavelength wrapping AWG design that has a FSR of 700 GHz and seven outputs separated by one channel spacing. The channel spacing is 100 GHz and the passband is designed to be Gaussian with full-width-half-maxium (FWHM) of 30 GHz. Although in the polarization splitter 100 of FIG. 1 the couplers are illustratively star couplers, other coupler having substantially similar functions as the star couplers, such as slab waveguide lenses, may be substituted for the star couplers of the present invention.

The polarization splitter 100 of FIG. 1, is approximately 5 mm×6 mm in size. Typically the difference between the TE and TM effective index of the polarization splitter of the present invention, such as the polarization splitter 100 of FIG. 1, is approximately 0.154%. Around the center wavelength of 1550 nm, this effective index difference causes a birefringence shift of substantially 2.4 nm, which, in the polarization splitter 100 of FIG. 1, equals approximately three channel spacings.

The polarization splitter of the present invention, such as the polarization splitter 100 of FIG. 1, is integrated using active-passive monolithic integration (APMI) techniques. For example, according to one fabrication technique, a shallow etched burried rib structure is used for forming the passive waveguides of the polarization splitter of the present invention. Such a technique provides record low propagation loss in InP material systems. An active section is then formed by another thin layer of multi-quantum-wells (MQW) directly on top of the rib which is burried by the same re-growth that forms passive waveguides. As such, the polarization splitter of the present invention may be used as an active device and a passive device. For example, the amplitude of the TE and TM modes may be independently controlled via, for example, amplification in the active sections, and as such an on-chip tunable polarization controller may be achieved. Preferably, InP/InGaAsP is the material of choice for a polarization splitter in accordance with the present invention because this material allows for monolithic integration with active photonic components such as transmitters, receivers, optical amplifiers, switches and the like. In this form, multiple waveguides may be placed in close proximity to each other such that each waveguide may be optimized for a specific optical function (e.g. active waveguide optimized for gain, passive waveguide optimized for ease of coupling, passive waveguide optimized for splitting, directional coupling or other passive devices).

Even further, a polarization splitter in accordance with the present invention is capable of active-passive monolithic integration (APMI) using other techniques known in the art. For example, a polarization splitter of the present invention may comprise opto-electronic integrated waveguide devices utilizing a tilted valence band quantum well semiconductor double heterostructure with one growth of the same waveguide material. As such, a polarization splitter of the present invention may be operated with no bias for normal passive operation or with reverse bias for operating as an active device. Such a technique is discussed generally in U.S. Pat. No. 5,953,479, issued to Zhou et al. on Sep. 14, 1999, which is herein incorporated by reference in its entirety.

Referring back to FIG. 1, in the polarization splitter 100, output waveguides No.1 and No.5 are illustratively depicted as the TM output and the TE output, respectively, for a wavelength channel centered around 1550 nm. As in typical AWG configurations, the numbering of the output waveguides of the polarization splitter 100 starts from the inner side (shorter waveguide side) to the outer side (longer waveguides side) of the curved waveguide array. The slightly higher effective index of the TE-mode would make the TE-mode appear about three channels to the inner side of the TM output. Given the fact that the output waveguide No.1 is matched by the output waveguide No.5 and that the birefringence shift is close to three channel spacings, it follows that the waveguide No.1 is the TM output and the waveguide No.5 is the TE output for the 1550 nm channel and channels that are integer numbers of the FSR away from 1550 nm.

In a polarization splitter of the present invention, such as the polarization splitter 100 of FIG. 1, a single channel signal enters the input waveguide 110 and is coupled into the AWG. As the TE-mode wave and TM-mode wave of the single channel input signal travel along the waveguide array 140, they arrive at different phase fronts before entering the free space region of the output coupler 130 of the AWG. The free space region then focuses the TE-mode wave and the TM-mode wave onto different image spots, shifted by the birefringence shift in wavelength on the output focal plane. Therefore by positioning the output waveguides 150 at these image positions, the polarization splitter 100 splits the TE and TM modes for the single channel input. By virtue of the FSR, the device will also work for wavelengths that are separated by integer times of the FSR of the AWG.

Figure 2:
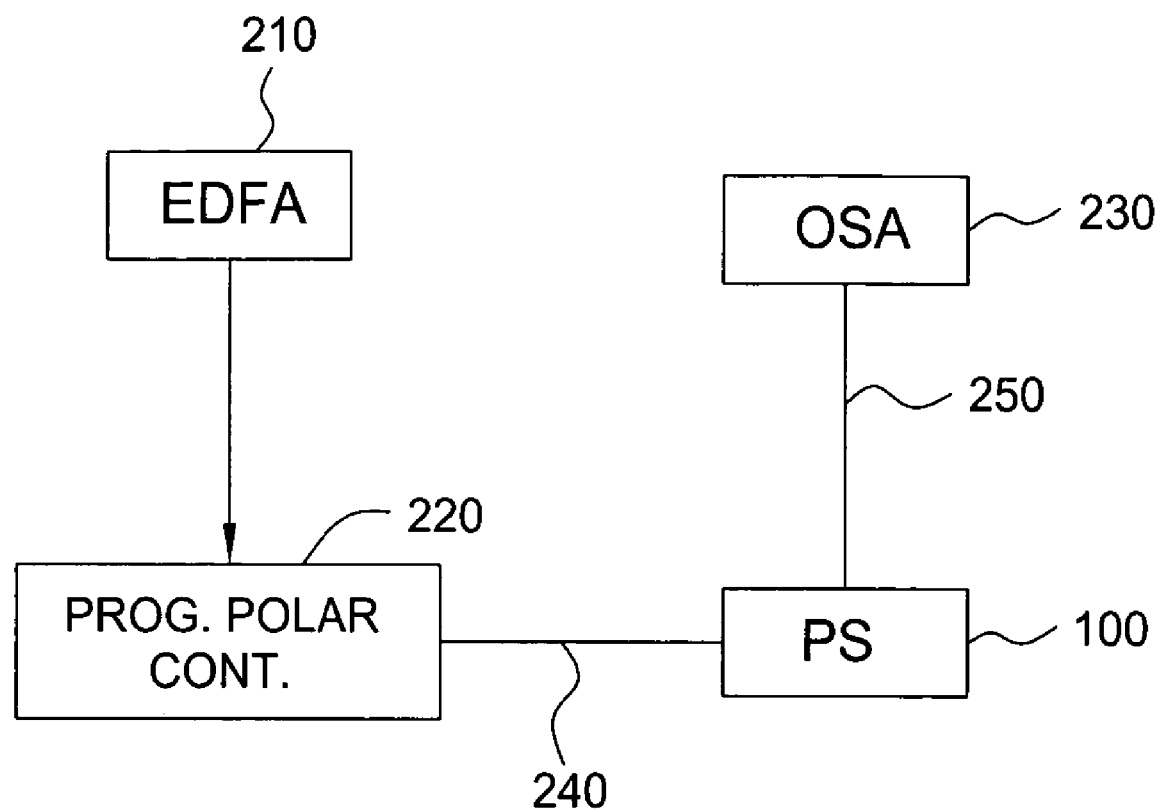
FIG. 2 depicts a high level block diagram of an experimental setup for the polarization splitter of FIG. 1.

FIG. 2 depicts a high level block diagram of an experimental setup for the polarization splitter 100 of FIG. 1. The experimental setup 200 of FIG. 2 comprises an unpolarized broad band ASE source (illustratively an Erbium doped fiber amplifier (EDFA)) 210, a programmable polarization controller (PPC) 220, an embodiment of a polarization splitter of the present invention (illustratively the polarization splitter 100 of FIG. 1) and an optical detector (illustratively an optical spectrum analyzer (OSA)) 230. The EDFA 210 is followed by the programmable polarization controller (PPC) 220. The first stage of the PPC 220 is a linear polarizer. The output of the PPC 220 is connected to a lensed fiber 240 through a connector (not shown). The nominal focal length of the lensed fiber 240 is 8 um. The lensed fiber 240 is mounted through a fiber holder on a three-axis translation stage (not shown). As such, the output of the PPC 220 is optically connected to the polarization splitter 100. The output of the polarization splitter 100 is coupled to a cleaved fiber 250, which is also mounted on a three-axis translation stage (not shown) through a fiber holder (not shown). Passbands are measured using the OSA 230 at the TM (No.1) output and at the TE (No.5) output of the polarization splitter 100, while the PPC 220 alter the input state of polarization (SOP) from TM-favored polarization to TE-favored polarization. In the experiment, the transmission of TE-favored polarization is first maximized at the TE output (No.5) by adjusting the PPC 220 to compensate any polarization changes caused by interconnecting fiber between the EDFA 210 and the input facet of the polarization splitter 100.

Subsequently, the first stage of the PPC 220 (e.g., the linear polarizer) is rotated at a step of six degrees for 90 degrees. Since the transformation of the SOP by the interconnecting fiber should be unitary, a rotation of the input SOP will cause the same rotation of the SOP at the output of the interconnecting fiber, therefore changing the input to the polarization splitter 100 from TM-favored polarization to TE-favored polarization.

Figure 3:
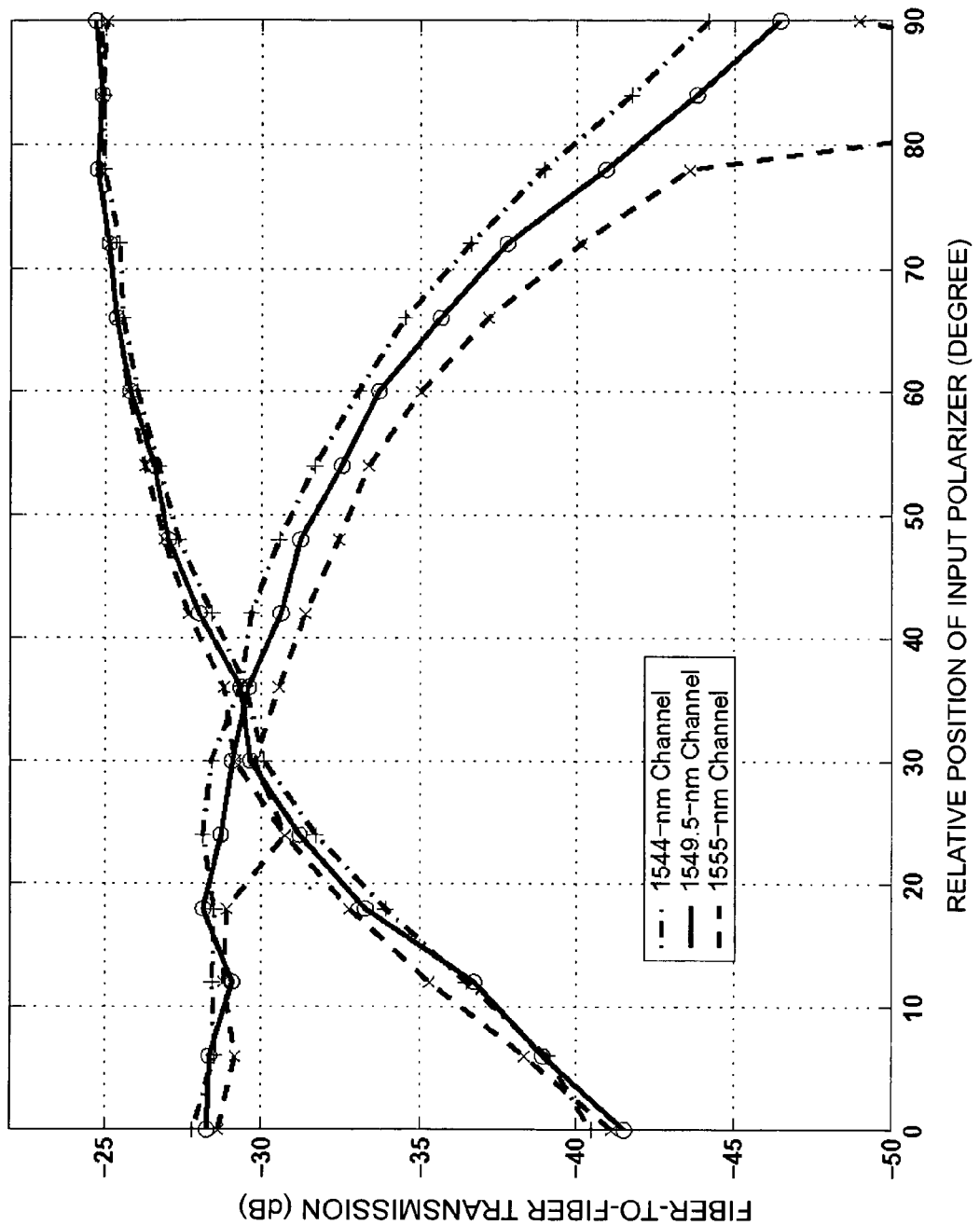
FIG. 3 graphically depicts the output power of the TM (No.1) output and the TE (No.5) output of the polarization splitter of FIG. 1.

FIG. 3 graphically depicts the output power of the TM (No.1) output and the TE (No.5) output of the polarization splitter 100 having an input wavelength of 1550 nm while changing the input SOP by rotating the input linear polarizer of the PPC 220. In FIG. 3, the output power of the TM (No.1) output and the TE (No.5) are plotted versus the relative position of the PPC 220 in degrees. It can be seen in FIG. 3 that the transmitted light power swings from the TM (No.1) output to the TE (No.5) output of the polarization splitter 100 when changing the input from TM-favored polarization to TE-favored polarization. An extinction ratio of 15 dB is achieved for both the TM and the TE modes. Similar polarization beam splitting is also achieved simultaneously for channels separated from the 1550 nm channel by integer numbers of the FSR. For example, FIG. 3 further graphically depicts the output power of the TM (No.1) output and the TE (No.7) output of the polarization splitter 100 for input wavelengths of substantially 1555 nm (dashed lines) and 1544 nm (dot-dashed lines). Similar performance in terms of extinction ratio is achieved for these channels as well. The limitation of the extinction ratio is mainly from the scattered backgrounds on the focal plane due to imperfect imaging and phase errors in the grating arms of the polarization splitter 100. These are the same limiting factors for the channel crosstalk of an AWG.

As depicted in FIG. 3, the maximum fiber-to-fiber transmission power at the TE (No.5) output of the polarization splitter 100 of FIG. 2 is approximately 25 dB, while the maximum fiber-to-fiber transmission power at the TM (No.1) output is approximately −28 dB. The coupling loss for the cleaved fiber 250 and the lensed fiber 240 are estimated to be approximately 10.5 dB and 5 dB, respectively. The facets of the fibers are not coated and the reflection loss from the two facets adds about 3 dB of loss. Connector losses and the reflections from uncoated fiber tips add up to another 1 dB of loss. This indicates that the total on-chip loss is approximately 5.5 dB for the TE mode and 8.5 dB for the TM mode, assuming that the TM mode and the TE mode have similar coupling losses. The difference in loss is attributed mainly to the different propagation losses of the TE and TM modes. The fact that the TM output is located at the edge of the Brillouin zone while the TE output is located near the center of the Brillouin zone may also contribute slightly to the loss difference between the TE output and the TM output.

The polarization splitter of the present invention is wavelength dependent. In addition, due to the properties of the AWG, the polarization splitter also performs wavelength multiplexing/demultiplexing with the channel filtering given by the AWG filter passband. The channel filtering can reduce the impact of broadband noise such as ASE generated along the transmission link, therefore improve the detected signal-to-noise ratio (SNR). Furthermore, multiple channel operation is achieved since channels that are separated by the FSR are equivalent in this respect.

The alignment of the output waveguides of the polarization splitter of the present invention is very important to the functionality of the polarization splitter. Furthermore, the simulated effective index difference determined above may be different from the actual one, causing an offset between the TE and TM modes. For example, in the polarization splitter 100, for an input channel at 1550 nm, slight shift in wavelength of 0.27 nm is observed between the measured TE and TM outputs. This wavelength shift may cause degradations for data signals passing through the polarization splitter of the present invention and should be minimized. For a given waveguide design and layer structure, however, the effective index difference between the TE and TM modes may be experimentally determined and corrected for in the design of a polarization splitter of the present invention. Because the shift between the TE and TM modes through an AWG is substantially only related to the effective index difference and the center wavelength, this error may be minimized by keeping good repeatability of the polarization splitter structure.

In alternate embodiments of the present invention, a polarization splitter in accordance with the present invention may split an input channel into polarization components other than the TE-mode and TM-mode components via the proper placement of the output ports of the AWG.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. An integrated polarization splitter having a passive portion and an active portion, comprising:
   an arrayed waveguide grating (AWG) in the passive portion, the AWG including:
   an input coupler;
   an output coupler; and
   a plurality of waveguides of unequal length connecting said input and output couplers;
   wherein at least two output ports of said AWG are positioned relative to an input port such that a first polarization component and a second polarization component of a single channel input signal arriving at different phase fronts of a free space region at an output side of said AWG are respectively received by separate ones of said output ports such that said first polarization component and said second polarization component are split by said AWG; and
   wherein the passive portion and the active portion are integrated in accordance with active/passive monolithic integration techniques, wherein the active portion comprises at least one active device for individually modifying at least one of said first polarization component and said second polarization component split by said AWG.

2. The polarization splitter of claim 1, wherein said first polarization component comprises a TE mode and said second polarization component comprises a TM mode of said input signal.

3. The polarization splitter of claim 1, wherein the polarization of input signals separated in wavelength from said single channel input signal by integer multiples of the free spectral range of said AWG is also split by said AWG.

4. The polarization splitter of claim 1, wherein at least one of said output coupler and said input coupler comprises a star coupler.

5. The polarization splitter of claim 1, wherein at least one of said output coupler and said input coupler comprises a slab waveguide lens.

6. The polarization splitter of claim 1, wherein said polarization splitter performs at least one of wavelength multiplexing and demultiplexing for input signals comprising more than a single channel.

7. The polarization splitter of claim 1, wherein said polarization splitter performs channel filtering.

8. The polarization splitter of claim 1, wherein said polarization splitter is fabricated from optical waveguides, each of said optical waveguides comprising:
a shallow etched buried rib structure passive layer; and
a thin layer of multi-quantum-wells (MQW) on top of the buried rib structure functioning as an active layer.

9. The polarization splitter of claim 1, wherein said polarization splitter further functions as a tunable polarization controller.

10. An integrated polarization splitter having a passive portion and an active portion, comprising:
an arrayed waveguide grating (AWG) in the passive portion, the AWG including:
at least one input means for receiving an input signal;
a means for coupling said input signal to said AWG;
a means for coupling an output signal from said AWG;
a plurality of waveguides of unequal length connecting said input coupling means and said output coupling means; and
at least two output means;
wherein said at least two output means of said AWG are positioned relative to said at least one input means such that a first polarization component and a second polarization component of said input signal arriving at different phase fronts of a free space region of said output coupling means of said AWG are respectively received by separate ones of said output means such that said first polarization component and said second polarization component are split by said AWG; and
wherein the passive portion and the active portion are integrated in accordance with active/passive monolithic integration techniques, wherein the active portion comprises at least one active device for individually modifying at least one of said first polarization component and said second polarization component split by said AWG.

11. The integrated polarization splitter of claim 10, wherein said input signal is a single channel input signal.

12. The integrated polarization splitter of claim 10, wherein said first polarization component comprises a TE mode and said second polarization component comprises a TM mode of said input signal.

13. The integrated polarization splitter of claim 10, wherein the polarization of input signals separated in wavelength from said input signal by integer multiples of the free spectral range of said AWG is also split by said AWG.

14. A method of fabricating a polarization splitter having a passive portion and an active portion, comprising:
integrating the passive portion and the active portion using an active/passive monolithic integration technique, wherein the passive portion comprises an arrayed waveguide grating, wherein at least two output ports of said AWG are positioned relative to an input port such that a first polarization component and a second polarization component of a single channel input signal arriving at different phase fronts of a free space region at an output side of said AWG are respectively received by separate ones of said output ports such that said first polarization component and said second polarization component are split by said AWG, wherein said active portion comprises at least one active device for modifying at least one of said first polarization component and said second polarization component.

* * * * *